(No Model.)
D. C. GANTER.
DEVICE FOR STEAMING AND COOKING PURPOSES.
No. 376,084. Patented Jan. 10, 1888.
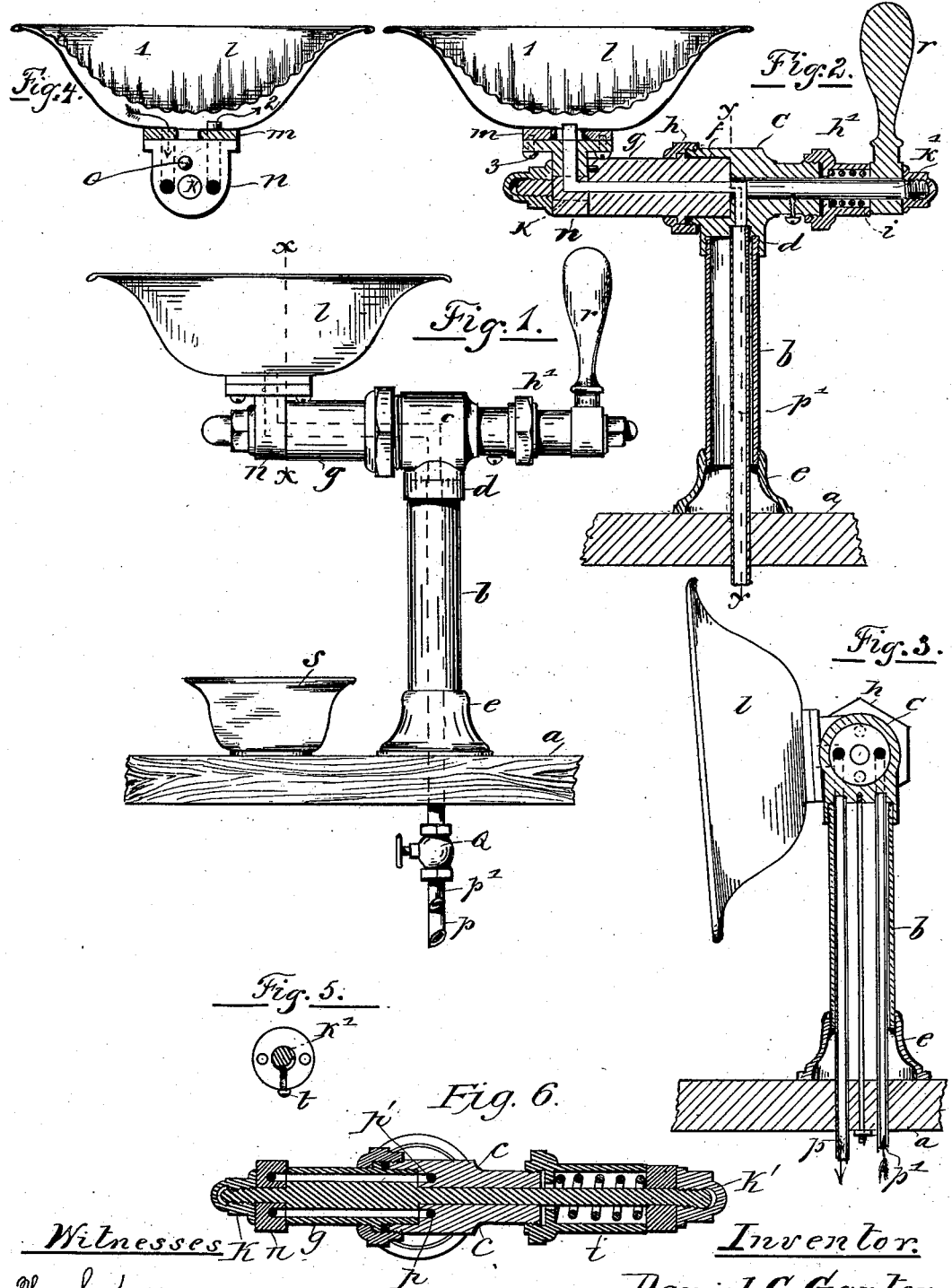
Witnesses
H. Soeper
H. Sturm
Inventor
Daniel C. Ganter
by Jacob W. Loeper atty

UNITED STATES PATENT OFFICE.

DANIEL C. GANTER, OF INDIANAPOLIS, INDIANA.

DEVICE FOR STEAMING AND COOKING PURPOSES.

SPECIFICATION forming part of Letters Patent No. 376,084, dated January 10, 1888.

Application filed November 29, 1886. Serial No. 220,210. (No model.)

*To all whom it may concern:*

Be it known that I, DANIEL C. GANTER, of the city of Indianapolis, county of Marion, and State of Indiana, have invented certain new and useful Improvements in a Device for Stewing Oysters and for Stewing and Cooking Purposes Generally, of which the following is a specification.

The object of my invention is to provide a convenient apparatus for the purpose of stewing oysters, and for stewing and cooking purposes generally, in hotels, restaurants, &c., where steam is employed for cooking purposes. I accomplish this object by means of the device illustrated in the drawings and described in the specification filed herewith and made a part thereof, and in which similar letters of reference refer to similar parts of my invention.

Figure 1 of my drawings is a front view of my device. Fig. 2 is a vertical section of Fig. 1. Fig. 3 is a vertical section of Fig. 2 on the line $y$ $y$, looking toward the left. Fig. 4 is a vertical section of the stew-pan on the line $x$ $x$ of Fig. 1, looking toward the left. Fig. 5 shows a section of a part of my invention, hereinafter more fully described. Fig. 6 is a horizontal central section taken longitudinally through the block $g$.

$a$ in Figs. 1, 2, and 3 represents the top board of a counter or table to which my device is attached.

$b$ represents a hollow standard, tapped with its lower end into a socket, $e$, and standing in an upright position on the top board, $a$.

$c$ is the body of a two-way faucet, provided on its under side with neck $d$, screwed to the standard $b$, and on its left side a socket, $f$, into which is fitted steam-tight the block $g$.

$h$ is a stuffing-box, turned out large enough to fit around block $g$, for the purpose of making said block steam-tight.

$h'$ is a nut provided with a jacket to receive the coiled pressure-spring $i$. The object of said spring $i$ is to pull the block $g$ firmly against the ground seat of the faucet $c$.

$k$ and $k'$ are pivots provided at their outer ends with nuts.

$l$ is a corrugated stew-pan with double bottom—the upper part, 1, to receive oysters or other cooking material, and the lower part, 2, the receiver for steam. The bottom part, 2, of said receiver is soldered to the plate $m$, and said plate is firmly attached to the supporting-shoe $n$ by means of screws 3. Shoe $n$ is bored out in the center sufficiently to admit pivot $k$, and is provided with a stay-pin, $o$, corresponding with a hole opposite the same on block $g$.

$p$ and $p'$ are steam-pipes inserted into the hollow standard $b$ and tapped into faucet $c$, as indicated in Figs. 2 and 3, $p'$ being the supply-pipe of steam and $p$ the discharge-pipe. Corresponding steam-ports are provided in faucet $c$ and block $g$, which enter into the steam-receiver of my stewing apparatus. (See Figs. 2, 3, and 4.)

The manner of operating my device for stewing, cooking, &c., is as follows: Having fitted together the different parts of my device and attached to the counter or table board $a$, I open the globe-valve $q$ and admit the steam into the pipe $p'$. The steam passes through the chamber 2, (see Fig. 4,) heating the stew-pan to the desired heat. The condensed water will pass through pipe $p$, which may be attached to a steam-discharge trap. After the oysters or the contents in the stew-pan are ready to be dished, I turn the block part of the faucet downward one-quarter turn by means of the handle $r$. The stew-pan will then stand in the position as illustrated in Fig. 3. The oysters or contents of the stew-pan will then drop into the dish $s$, placed below the stew-pan. By this operation the steam and exhaust are shut off automatically, as seen in Fig. 3. $t$ in Fig. 5 is a set-screw, which enters into a groove cut into the pivot $k'$, and serves for the purpose of allowing the block $g$ to turn no farther than one-fourth of a turn.

The whole of my device may be made of brass, copper, or any suitable material.

The corrugated bottom of the pan, because of the corrugations extending, as shown, substantially parallel with one another across the bottom of the pan and in the direction of its tilting movement, serves to effect a more speedy and thorough emptying of the contents of the pan, and also serves to intercept the passage of steam along the bottom and to retain it in the pockel-like grooves between the corrugations, thereby enabling it to exert its heat over an extended portion of the surface, and causing the food to cook more rapidly. Such construction also adds to the strength of the bottom.

Having thus described my invention, its purposes, and advantages, what I claim as new, and desire to secure by Letters Patent, is—

1. In a device for stewing oysters and the like, the combination, with a standard-support and a rocking block secured to the standard-support, of a double-bottomed pan secured to the rocking support and adapted to be tilted by the rocking of the block, the upper section of the double bottom of the pan being provided with corrugations extending substantially parallel with one another, and in the general direction of the tilting motion of the pan, for the purpose substantially as set forth.

2. The herein-described device for stewing oysters and the like, consisting, essentially, of the hollow standard adapted to be secured to a table or other support, the arm or block $g$, secured to the standard in rocking adjustment and provided with steam supply and discharge passages, a stew-pan secured to the arm or block and provided with a steam-chamber beneath its bottom, steam supply and discharge pipes leading within the standard to the steam-passages in the arm or block, a spring adapted to hold the arm or block on its seat, and stuffing-boxes and fastenings, substantially as set forth.

3. The herein-described device for cooking oysters and the like, comprising the double-bottomed stew-pan, the arm or block $g$, two-way faucet, stuffing-boxes $h$ and $h'$, handle $r$, spiral spring $i$, standard-pipe $b$, and supply and discharge pipes $p$ $p'$, constructed and arranged substantially as set forth.

In witness whereof I have hereunto set my hand and seal, at Indianapolis, Indiana, this 19th day of November, A. D. 1886.

DANIEL C. GANTER. [L. S.]

In presence of—
FRANK H. GOHERN,
JAS. D. KAYLOR.